(12) United States Patent
Balyberdin et al.

(10) Patent No.: US 7,669,791 B2
(45) Date of Patent: Mar. 2, 2010

(54) METHOD AND DEVICE FOR PRODUCING HIGHLY ACTIVE RUBBER POWDER FROM RUBBER WASTES

(75) Inventors: Vladimir Balyberdin, Moscow (RU); Roudolf Gorelik, Moscow (RU)

(73) Assignee: Deutsche Gumtec AG, Halle (DE)

( * ) Notice: Subject to any disclaimer, the term of this patent is extended or adjusted under 35 U.S.C. 154(b) by 420 days.

(21) Appl. No.: 11/724,407

(22) Filed: Mar. 15, 2007

(65) Prior Publication Data

US 2009/0095826 A1    Apr. 16, 2009

Related U.S. Application Data

(62) Division of application No. 10/517,121, filed on Jun. 14, 2006, now Pat. No. 7,344,098.

(30) Foreign Application Priority Data

Jun. 4, 2002   (EP)   .................. 02012210
May 17, 2003   (WO)   ............... PCT/EP03/05202

(51) Int. Cl.
    *B02C 11/08*    (2006.01)
(52) U.S. Cl. ................ 241/23; 241/24.27; 241/DIG. 31
(58) Field of Classification Search .................. 241/23, 241/24.27, DIG. 31
    See application file for complete search history.

(56) References Cited

U.S. PATENT DOCUMENTS

| 3,718,284 A | 2/1973 | Richardson |
| 3,923,256 A | 12/1975 | Dorner |

(Continued)

FOREIGN PATENT DOCUMENTS

DE    37 17 571    6/1988

(Continued)

*Primary Examiner*—Faye Francis
(74) *Attorney, Agent, or Firm*—Roberts & Roberts, LLP

(57) ABSTRACT

Highly-active rubber powder is obtained from old tires etc. by 2-stage pulverisation in a special extruder, involving an increase in volume stress to 15-250 MPa at 5-90 MPa/second, pulsating with an amplitude of +/−5-20 MPa and a frequency of 5-600 Hz, and at 90-380° C. (increasing at 50-150° C./sec), followed by a sharp reduction of volume stress at 50-150 MPa/sec. A method for the production of highly-active rubber powder with a specific surface of 0.4-5 m2/g from old tires and scrap vulcanised rubber articles based on various rubbers by 2-stage thermo-mechanical treatment in an extruder. This involves (a) fine pulverisation and (b) sharp reduction of the volume stress. An apparatus for the production of highly-active rubber powder includes a cylindrical housing with feed and discharge connections, a compression zone and pulverisation zone(s), each with a compression screw with grooves decreasing in depth in the machine direction and a rotating coaxial activator with grooves on its outer working surface, the housing, screw and activator being provided with cooling elements. One of the two pulverisation zones (A) is a zone formed by the housing and a multi-thread compression screw in which the inter-thread volume decreases towards the outlet and the inner surface is formed by a conical opening which slopes towards the outlet and by 3-6 meshing grooves of rectangular cross-section. The second pulverisation zone (B) is formed by (a) a rotating activator with a discharge screw rigidly fixed to it and aligned with the compression screw and (b) the surrounding housing.

19 Claims, 3 Drawing Sheets

U.S. PATENT DOCUMENTS

| | | |
|---|---|---|
| 5,273,419 A | 12/1993 | Mayer et al. |
| 5,883,139 A | 3/1999 | Wideman et al. |
| 5,904,885 A | 5/1999 | Arastoopour et al. |
| 6,077,874 A | 6/2000 | Wideman et al. |
| 6,325,307 B1 | 12/2001 | Nikolskii |

FOREIGN PATENT DOCUMENTS

| | | |
|---|---|---|
| DE | 44 25 049 | 1/1996 |
| EP | 937742 | 2/1988 |
| EP | 972792 | 7/1988 |
| FR | 2 574 698 | 6/1986 |
| RU | 2038214 | 6/1995 |
| RU | 2057013 | 3/1996 |
| RU | 2060833 | 5/1996 |
| RU | 2076045 | 3/1997 |
| RU | 2128115 | 3/1999 |
| RU | 2143324 | 12/1999 |
| RU | 2167.056 | 2/2000 |
| RU | 2167057 | 5/2001 |
| RU | 2173634 | 9/2001 |
| RU | 2173635 | 9/2001 |
| WO | WO 95/21047 | 8/1995 |
| WO | WO 96/36470 | 11/1999 |
| WO | WO 02/16099 | 2/2002 |

Formation of the porous structure in the initial phase of reducing the volume stress during tire rubber crushing Microcrack formation due to pore tearing during a marked volume stress reduction on tire rubber crushing

METHOD AND DEVICE FOR PRODUCING HIGHLY ACTIVE RUBBER POWDER FROM RUBBER WASTES

CROSS REFERENCE TO RELATED APPLICATION

This application is a division of U.S. patent application Ser. No. 10/517,121 filed Jun. 14, 2006, now U.S. Pat. No. 7,344,098, which is incorporated herein by reference.

BACKGROUND OF THE INVENTION

1. Field of the Invention

The invention relates to the field of the processing of scrap tyres and waste of rubber articles based on different rubber types and is intended for the manufacture of highly active rubber powder for the effective reuse thereof.

The recycling process essentially comprises two stages:
1. Preprocessing tyres and waste of rubber articles in order to obtain maximum textile and metal cord-free rubber pieces of dimensions 10 to 15 mm.
2. Final processing of the pieces obtained in order to obtain a rubber powder of maximum effectivity for reuse purposes stage.

The invention relates to the second stage.

2. Description of the Related Art

Numerous processes are known for the processing of scrap tyres and waste of rubber articles either through mechanical impact action on waste cooled to low (cryogenic) temperatures using hammer, stud and other crushers (U.S. Pat. No. 3,718,284, B 02 C 11/08, published in 1978 and Russian patent 2 060 833, B 29 B 17/02, priority of 30 Nov. 1993, published on 27 May 1996) or successive impact and cutting action at temperatures of 0 to 60° C. in shredders, grooved rollers, etc. (U.S. Pat. No. 3,923,256, B 02 C 23/14, published 1975, Russian patent 2 076 045, B 29 B 17/00, priority 29 Dec. 1990, published 27 Mar. 1997, Russian patent 2 057 013, B 29 B 17/00, priority 7 Feb. 1994, published 27 Mar. 1996, Russian patent 2 128 115, B 29 B 17/00, 17/02, priority 4 Apr. 1997, published 27 Mar. 1999, Russian patent 2 076 045, B 29 B 13/10, 17/00, priority 29 Dec. 1990, published 27 Mar. 1997, German patent 37 17 571, B 02 C 18/24, 13/26, priority 25 May 1987, published 23 Jun. 1988, German patent 44 25 049, B 29 B 17/00, priority 15 Jul. 1994, published 18 Jan. 1996, EP 937742, priority 20 Feb. 1998, U.S. Pat. No. 27,312 published 25 Aug. 1999, EP 972792, priority 15 Sep. 1998, U.S. Pat. No. 115,975, published 19 Jan. 2000).

These processes do not make it possible to produce rubber powders with a high specific, geometrical surface area, which is a criterion of the activity of the powder, in spite of the possibility of the production of very finely ground powders. The maximum specific, geometrical surface of the powder with a particle size of 20 μm does not exceed $0.12 \, m^2/g$.

Numerous apparatuses are known for the production of powders with a relatively high physical and chemical activity from vulcanized rubber waste. In particular, Russian patent 2 038 214, B 29 B 17/00, priority 29 Aug. 1991, published 27 Jun. 1995, Bull. No. 18, German patent 4128630 disclose an apparatus, which has two-worm shafts with three cam zones for crushing, separation and cooling. According to the cited document the crushing of the material results from its successive passage through these zones, which is unjustified from the energy consumption purposes, because more than half of the material is subject three times to heating and cooling, because each of the three cam crushing zones delivers no more than 25% powder with a necessary fraction composition (particle size no more than 0.8 mm).

It is also impossible to achieve in said apparatus optimum crushing or size reduction parameters (temperature, pressure, time), where the specific geometrical surface of the powder would exceed a value of $0.4 \, m^2/g$, because the crushing of the material takes place on the contacting cam surfaces having no cooling. In addition, the cam zones are extremely sensitive to the presence in rubber waste of foreign bodies (sand, stones, metal cord) and the latter penetrate the gaps between the cams leading to the fracture thereof.

An apparatus is known (Russian patent 2 143 324, B 02 C 19/22, priority 5 Feb. 1998, published 27 Dec. 1999, Bull. No. 36), where the crushing of polymer materials, including elastomers, takes place on two contacting, conical working elements in the form of polygonal disk cams.

The main disadvantage of this apparatus is that coolants are completely lacking and without them the production of powders with an increased surface area is problematical.

One-worm-apparatuses with cylindrical casings are known within which in coaxially succeeding and aligned manner are mounted in rotary form a compacting worm and a working member (Russian patent 2 167 056, B 29 B 17/00, 13/10, B 02 C 18/44, 19/22/B 29 K 101.00, priority 23 Feb. 2000, published 20 May 2001, Bull. No. 14 and Russian patent 2 167 057, B 29 B 17/00, 13/10, B 02 C 18/44, 19/22/B 29 K 101.00, priority 23 Feb. 2000, published 20 May 2001, Bull. No. 14).

The processing of the material in these apparatuses does not take place in an elongated annular clearance between the casing and the working member, but instead in annular chambers. In these apparatuses elements such as the casing, worm and working member in each case have independent coolants. Simultaneously the use of the working member in the form of successively positioned, small, annular chambers with a decreasing depth or the construction on the casing or working member, downstream of the worm, of a chamber does not make it possible to achieve the necessary temperatures and pressures in the annular clearance enabling the production of active rubber powders to take place.

Technically the closest to the process proposed is an extrusion processing process, which is performed by the action of shearing deformations, which are sufficient to destroy a large number of rubber pieces and give powders with a particle size up to 0.1 mm (Russian patent 2 057 013, B 29 B 17/00, priority 7 Feb. 1994, published 27 Mar. 1996, Russian patent 2 173 634, B 29 B 13/10, 17/00, 7/42, B 02 C 19/20, 19/22/B 29 K 101.00, priority 23 Aug. 2000, published 20 Sep. 2001, Bull. No. 26).

The main disadvantage of this processing process is a low efficiency of the procedures involved (up to 104 kg/h). In addition, it is difficult when processing vulcanized rubber using the described process to take account of technical and technological characteristics of the differently based rubbers, particularly those based on a high plastic deformation component. In the case of rubbers with a high elastic deformation component which for processing require much higher values of the sliding stress and pressure, it is difficult to adjust the pressure and temperature permitting the maximum size reduction of the product. In addition, the rubber powders produced by this process are characterized by a short storage time of 7 to 10 days, after which their activity decreases and capability greatly increases. It is therefore most appropriate to create in a rubber processing apparatus zones which ensure the obtaining of higher pressure and temperature values for the material to be processed and the provision of chemical modifiers in order to maintain the powder activity.

Closest to the apparatus according to the invention is an apparatus for producing a powder from polymer material (Russian patent 2 173 635, B 29 B 13/00, 17/00, B 02 C 18/44, 19/22/B 29 K 101.00, priority 23 Aug. 2000, published 20 Sep. 2001), which has a cylindrical casing provided with a charging connection and a discharging connection and within which are formed compacting and size reducing zones, which are provided with a compacting worm with a depth of the grooves between the combs decreasing in the direction of the size reduction zone and a working member in the form of a rotary body on whose working outer surface are formed slots. The two elements are mounted in a coaxially rotatable manner relative to the inner face of the casing, accompanied by the formation therewith of an annular clearance. The casing, compacting worm and working member are provided with coolants. Although it is possible with the described apparatus to produce powder having an adequately large specific surface (up to 0.5 m$^2$/g), the capacity or output of the apparatus is not particularly high (max. 104 kg/h). In addition, this apparatus does not make it possible to crush all rubber types, e.g. rubbers having high deformation plastic component values (based on polychloroprenes, cis-isoprene rubbers with a high plasticizer content, chlorobutyl and bromobutyl rubbers, because the apparatus lacks a gas saturation zone and a second crushing zone.

SUMMARY OF THE INVENTION

The technical result of the invention is a universal, high efficiency, energy-saving process making it possible to produce highly active rubber powders from scrap tyres and vulcanized waste of rubber articles with a specific, geometrical surface up to 5 m$^2$/g, as well as an apparatus for performing this process.

The technical result is achieved in that in the process for the production of a highly active rubber powder with a specific, geometrical surface of 0.4 to 5.0 m$^2$/g from scrap tyres and vulcanized waste of rubber articles based on different rubber types, preferably isoprene, butadiene, butadiene styrene, butadiene nitrile rubbers, including hydrogenated, carboxylated, ethylene, propylene, fluorine, fluorosilicone, butadiene vinyl pyridine, silicone, epichlorohydrin, polychloroprene, chlorosulphonated, polyisobutylene acrylic rubbers and mixtures thereof crushing takes place in an extruder-type apparatus under thermomechanical action. According to the invention, the crushing of vulcanized rubbers takes place in two stages:

Under the conditions of a volume stress of 15 to 150 MPa increasing at a rate of 5 to 90 MPa/s with an amplitude of ±5 to 20 MPa and pulsating at a frequency of 5 to 500 Hz, as well as one with a temperature rising at a rate of 50 to 150° C./s in a range of 90 to 380° C. accompanied by the simultaneous gas saturation of rubber with degradation products of plasticizers and other constituents belonging to the rubber composition, their comminution initially takes place accompanied by the formation of a porous structure in the volume of the rubber particles.

Whilst greatly reducing the volume stress at a rate of 50 to 150 MPa/s, the porous structure is destroyed, the specific, geometrical surface of the rubber particles is increased and said rubber particles are cooled.

During the performance of the process for the production of a rubber powder with a specific, geometrical surface of no less than 0.4 m$^2$/g from scrap tyres and vulcanized waste of rubber articles, for the destruction thereof a deformation is possible in a range of 105 to 250% of the limit of the elastic component of rubber deformation.

The effectiveness of this process is increased in the presence of heterogeneity modifiers, namely alcohol telomers of general formula H(CF$_2$—CF$_2$)$_n$—CH$_2$OH, N-nitrosodiphenylamine, N-cyclohexylthiophthalimide and chlorinated paraffins in a quantity of 0.1 to 1.9%, which makes it possible to increase the specific, geometrical surface by 15 to 40%, the efficiency of the process by 10 to 55% and the powder storage time from 1 to 6 to 9 months, whilst avoiding caking during transportation.

A considerable increase in the efficiency is also brought about by a physicochemical treatment of the working surfaces of the sleeves with fluorine-containing, organic substances e.g. with alcohol telomers and/or with materials containing tungsten, nickel, chromium, boron, molybdenum, as well as carbides and nitrides of very high melting point metals, which leads to a reduction of the rubber on metal friction coefficient from 0.82-0.87 to 0.36-0.42.

In the performance of the process for producing a highly active powder from rubber waste, in whose formulation constituents degradable at high temperatures are lacking, rubber crushing takes place in the presence of modifiers in a quantity of 0.7 to 5.0% and which combined with the rubber form volatile substances at a temperature of 70 to 120° C. The modifiers used are sulphenamide M, sulphenamide Z, alcohol telomers, stearic, oleic, citric and oxalic acid.

The process of the invention can also be used for the production of mixed thermoelastoplastics, where a joint size reduction of the waste of rubber articles and thermoplastics and/or thermoelastoplastics such as polyethylenes, polypropylenes, polyvinyl chlorides, polyethylene terephthalates, butadiene-styrene-block copolymers, etc. takes place.

The technical result is also achieved by the fact that in an apparatus for the production of active rubber powders from scrap tyres and waste of rubber articles and having a casing with a charging connection and a discharging connection together with coolants, within which is mounted in rotary coaxial manner a drive, accompanied by the formation of an annular clearance and equipped with a cooling element are installed a compacting worm with a variable depth decreasing in the discharging connection direction and an activator, on whose outer surface and on the casing inner surface facing the activator are formed cutting grooves, on the casing inner surface facing the compacting worm longitudinal ribs are provided, according to the invention on a shaft are mounted a multistart compacting worm and an activator rigidly connected thereto and constructed as a rotary body, as well as a discharging worm, which can be constructed as an independent part or in one piece with the compacting worm. The activator is externally provided with multistart, helical notches with a constant depth in the direction of movement of the material to the discharging connection and in the reverse direction, with an equal number of starts and with a pitch which is 1.1 to 2.5 times greater than the pitch of the compacting worm, and the discharging worm is provided with multistart, helical combs in the straight direction with a pitch, which is 1.15 to 3.0 times greater than the pitch of the compacting worm, with an interturn gap between the worms, which increases in the straight direction through the reduction in the number of worms, the combs being constructed in continuous manner or interrupted by multistart, helical notches in the reverse direction with a pitch equal to the pitch of the combs and the ratio of the length of the activator along the axis to the length of the discharging worm being in a range 0.2:1 to 1:0.3 and in the casing inner surface, which is connected to the worms with a pitch of 0.5 to 1.5 of the starting cut pitch of the particular worm, are formed multistart notches in the straight direction and/or crossing notches in the straight and reverse direction with a semicircular profile and with a radius corresponding to 0.01 to 0.03 diameter of the worm and a depth 5 to 15% smaller than the radius, the number of notches in one direction being in the range 3 to 50 and the ratio of the number of notches in the straight and reverse direction being 0.3:1.0 to 1.0:0.3.

In the apparatus the notches are made in the straight and reverse direction within the casing in the inner surface of a detachable or releasable sleeve comprising one or two parts.

The worms can be formed on the outer surface of one detachable sleeve or both sleeves.

The cooling elements in the apparatus are constructed as single start, helical grooves with an increased surface area of the walls on the detachable sleeves of the casing and the worms, on the side free from the starting cuts for the through-flow of the cooling medium.

In the construction of the apparatus, the drive is based on an electric motor with a constant or variable speed and a control range of 1:15.

Such a construction of the apparatus provides conditions for the two-stage crushing of rubber, initially an increase in the volume stress and temperature with the necessary speed and the simultaneous gas saturation of rubber accompanied by the formation of a porous structure in the particle volume and then on greatly reducing the volume stress with the preset speed where the porous structure is destroyed, the specific, geometrical surface of the rubber particles is increased and the particles are cooled.

Thus, according to the invention, the crushing of scrap tyre pieces and rubber article waste with a size of 10 to 15 mm takes place in the above-described apparatus in two stages ensuring comminution of rubber in accordance with the following diagram. On the rubber pieces acts an increasing, pulsating volume stress with an amplitude of 5 to 20 MPa and a frequency of 5 to 500 Hz in a range of 15 to 150 MPa. The increase rate is 5 to 90 MPa/s, which leads to a rapid heating and crushing of the rubber to be processed. Heating takes, place at a rate of 50 to 150° C./s to 90-380° C./s, as a function of the rubber type to be processed.

The precision of maintaining the temperature of the object to be crushed is ensured by a regulatable liquid cooling of the apparatus.

Such a diagram of producing in the apparatus the pulsating pressure and heating not only contributes to the crushing of the rubber, but also to its gas saturation with volatile substances, which are formed during the heating and degradation of the plasticizers and other constituents, which contain volatile substances or which are separated during degradation.

The construction of the porous structure in the particles of the crushed rubber can be clearly gathered from FIG. 1.

It is also pointed out that the necessary volume stress values are also determined by the rubber type and are dependent on the rubber deformation elastic component. The elastic component limit during deformation with uniaxial expansion can be obtained mathematically according to the formula:

$$\gamma = \delta/2\delta T$$

Where $\delta$ is the difference of the normal stresses and $\delta T$ the tangential stress—Tager A. A., Physical Chemistry of Polymers, 1968, "Chimiya" publishing house, Moscow, p 261.

In this crushing stage it is necessary to deform the vulcanized rubber in a range of 0.105 to 250% of the rubber deformation elastic component limit. The deformation quantity of the rubber of 105 to 145% makes it possible to destroy particles of vulcanizates with a high plastic component of deformation and 150 to 250% with a high deformation elastic component.

The next rubber crushing stage in the apparatus comprises a strong decrease in the volume stresses at a rate of 15 to 150 MPa/s, which leads to the tearing of the pores and to the formation of large numbers of microcracks on the surface of the rubber particles, which gives rise to a marked increase in the specific, geometrical surface thereof and correspondingly an increase in the physical and chemical activity (FIG. 2) and the cooling of the powder to be discharged to a temperature of 40 to 60° C.

As has been shown by experiments, the use of heterogeneity modifiers leads to a marked increase in the number, of microcracks in rubber powder particles, these including alcohol telomers of formula $H(CF_2-CF_2)_n-CH_2OH$, where n>4, N-nitrosodiphenylamine, N-cyclohexylthiophthalimide and chlorinated paraffin.

The use of these modifiers in a quantity of 0.1 to 1.9% makes it possible:

to shorten the time for reaching the optimum stress values in the first processing stage by increasing the volume of the rubber pieces to be transported (reduction of the rubber/metal friction coefficient), which makes it possible to increase the apparatus efficiency by 10 to 55%, to increase the specific, geometrical surface of the powder by 15 to 40%, to increase the maintaining of the high physical and chemical activity of the rubber powder from 7 to 30 days to 6 to 9 months, to avoid caking of the active rubber powder during storage and transportation.

All the elements of the movable and stationary parts of the apparatus ensures the performance of the process according to the invention.

The first crushing stage characteristic for sliding crushing takes place between the combs of the compacting worm at the end thereof. The necessary rate of rise of the volume stresses and temperature, as well as the efficiency of rubber crushing in this stage are determined by the speed of the worm, the ratio of the thread lead of the combs of the compacting worm and the notches on the casing surface facing the worm, together with the extension of the worm along the rotation axis.

The pulsation of the volume stress intensifies the compacting, heating and crushing processes. The frequency and amplitude of the pulsation of the volume stress are predetermined by the number of helical notches in the reverse direction on the casing surface facing the worms, the number of starts on the compacting worm and the number of helical notches on the activator surface.

The gas saturation of the rubber particles and the formation of gas-filled micropores therein starts at the end of the compacting worm following on to the activator and ends at the start of the discharging worm, when the pressure on the material starts to decrease sharply. As a result of the starting cut pitch of the notches and their number on the activator surface, as well as by the length thereof, it is possible to regulate the gas saturation process via a more uniform thorough heating of the material and a more complete evaporation of the rubber constituents.

Thus, the activator regulates the crushing process in that it creates the conditions of a more uniform thorough heating of the material up to higher temperatures.

The second crushing stage starts at the beginning of the discharging worm following on to the activator and ends in the vicinity of the discharging connection. During the performance thereof it is important to maintain the material volume stress drop rate and avoid a premature reduction to the pressure in the micropores, which destroy the micropore walls and therefore greatly reduces the specific, geometrical surface of the particles and decreases the temperature thereof. The volume pressure drop rate is determined by the interturn space volume between the combs in the straight direction of this worm part, their starting cut pitch and the depth of the turns, as well as the starting cut pitch and number of starts of the helical notches in the straight direction on the casing surface facing the worm.

The presence of multistart, helical notches in the reverse direction with the same pitch as the combs in the straight direction, but with a smaller number of notches (or starts) on the discharging worm influences the temperature of the powder passing out of the discharge opening of the apparatus.

The comparison of the inventive technical solution with the closest prior art makes it possible to assert that the novelty criterion is fulfilled and the lack in the known technical solutions of the characterizing features of the inventive process and apparatus for the production of a highly active rubber powder makes it clear that the solution according to the invention has the necessary inventive merit.

DETAILED DESCRIPTION OF THE INVENTION

Figure 1:
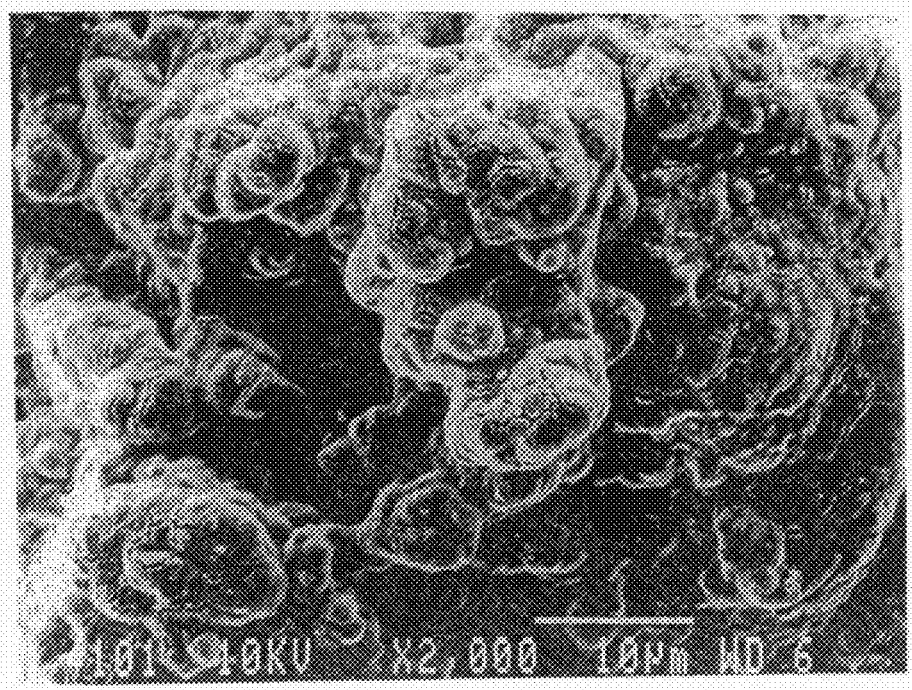
FIG. 1 is a photograph of the rubber particles obtained by scanning electron microscope JSV-840 (JOEL) at the time of the formation of the porous structure in the initial (first) tyre rubber crushing stage.
Figure 2:
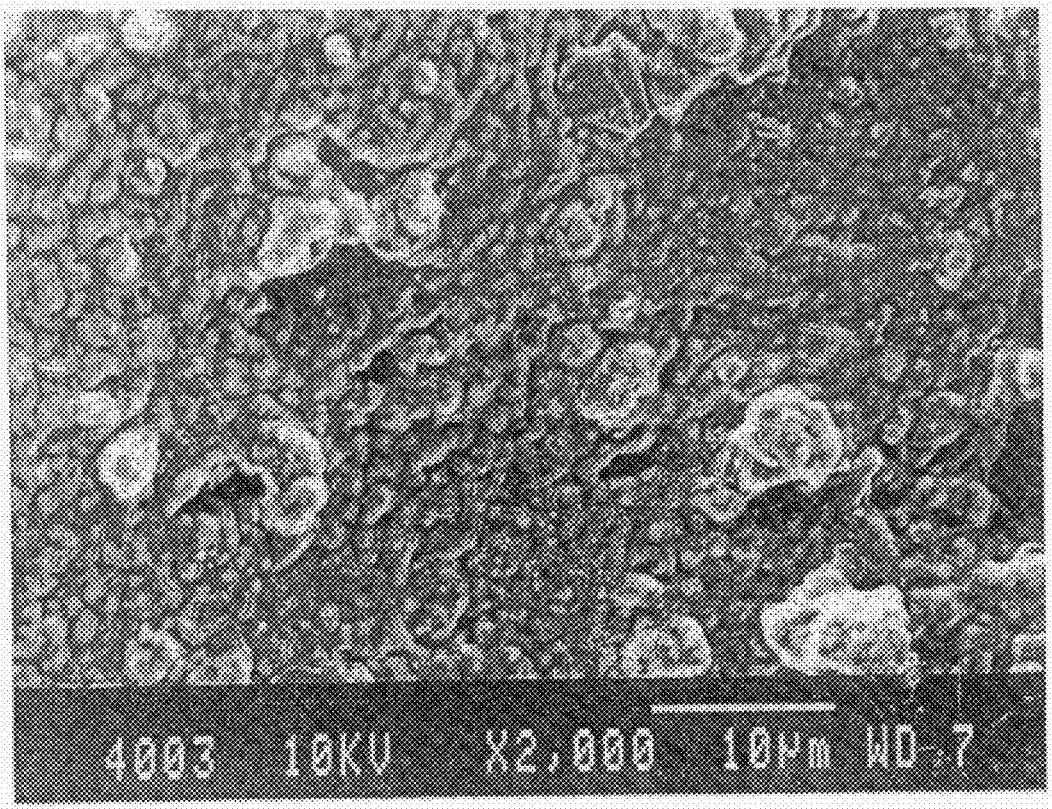
FIG. 2 is a photograph of rubber particles obtained with the same scanning electron microscope after the formation of microcracks by tearing of the pores in the case of a strong volume stress drop during tyre rubber crushing.

The apparatus for the production of a highly active rubber powder from scrap tyres and rubber article waste (FIG. 3) has a casing 1 with a charging connection 2 and a discharging connection 3 within which is located an activator 4, in whose lateral face are formed multistart, helical notches in the straight and reverse directions, as well as a discharging connection 5 with multistart, helical combs in the straight direction and which are cut through in the reverse direction by helical notches.

On the charging connection side of the activator is coupled a multistart compacting worm 6 and/or is constructed in one piece therewith. The compacting worm and the activator are fitted to a shaft 8 and constructed on the outer surface of a detachable sleeve and on the inside thereof is provided a cooling element in the form of a single-start, helical channel.

On the inner surface of the casing 1 is mounted a detachable sleeve 9, on whose inner surface facing the compacting worm 6 are formed multistart, helical notches with a semicircular profile in the straight and reverse direction, as well as on the surface facing the activator. On the outside of the sleeve 9 is formed a cooling element 10 as a single start, helical channel.

Below the charging connection there are three to six rectangular ribs 11 uniformly distributed around the circumference of the casing.

Thus, within the casing 1 two size reduction or crushing zones are formed.

The first zone has a charging area, a compacting area and a first crushing area and is formed by the multistart compacting worm 6 and a part of the sleeve 9 surrounding the same and on whose inner surface is provided a conical opening up to the first crushing area with the three to six ribs 11 and also a cylindrical opening with a diameter 1.003 to 1.02 times larger than the diameter of the compacting worm 6 and in the inner surface of the latter and with a pitch which is 0.5 to 1.5 times larger than the starting cut pitch of the compacting worm, are formed 3 to 50 multistart, helical notches with a constant depth and located in the straight and/or reverse direction. The ratio of the lengths along the rotation axis of the compacting area and the first crushing area is in a range 1:05 to 0.5:1. The multistart, helical notches are formed with a semicircular cross-sectional profile with a radius amounting to 0.005 to 0.03 times the compacting worm diameter and with a depth which is 5 to 15% smaller than the radius, the ratio between the number of notches in the straight and reverse direction being in a range 0.3:1.0 to 1.0:0.3.

The second crushing zone has a gas saturation area, a second crushing area and a discharging area. They are formed by an activator in the form of a rotary body and a discharging-worm rigidly coupled thereto, as well as a casing surrounding the two components. The activator with the discharging worm is aligned with the compacting worm and is coaxial to the casing inner surface. In the outer surface of the activator and with a pitch which is 1.1 to 2.5 times greater than the starting cut pitch of the compacting worm are formed multistart, helical notches with a constant depth in the straight and reverse direction and with the same pitch and the same number of starts and on the outer surface of the discharging worm are provided multistart, helical combs in the straight direction with a pitch which is 1.15 to 3.0 times greater than the starting cut pitch of the compacting worm, with a volume of the interturn space which increases in the discharging connection direction. The worm combs are either continuous or are interrupted by the helical notches in the reverse direction with a pitch equal to the starting cut pitch of the combs.

The casing inner surface which is cylindrical and surrounds the activator and discharging worm is provided with multistart, helical notches, which are formed with a pitch which is 0.5 to 1.5 times smaller than the starting cut pitch of the notches on the activator and the combs on the discharging worm in the straight and reverse direction. The ratio of the lengths along the rotation axis of the activator and the discharging worm are in a range 0.2:1 to 1:0.3 and the multistart, helical notches on the casing, activator and discharging worm have a semicircular cross-sectional profile with a radius which is 0.005 to 0.03 times the compacting worm diameter and a depth which is 5 to 15% smaller than the radius, the ratio between the number of notches in the straight and reverse directions being in a range of 0.3:1.0 to 1.0:0.3.

Figure 3:
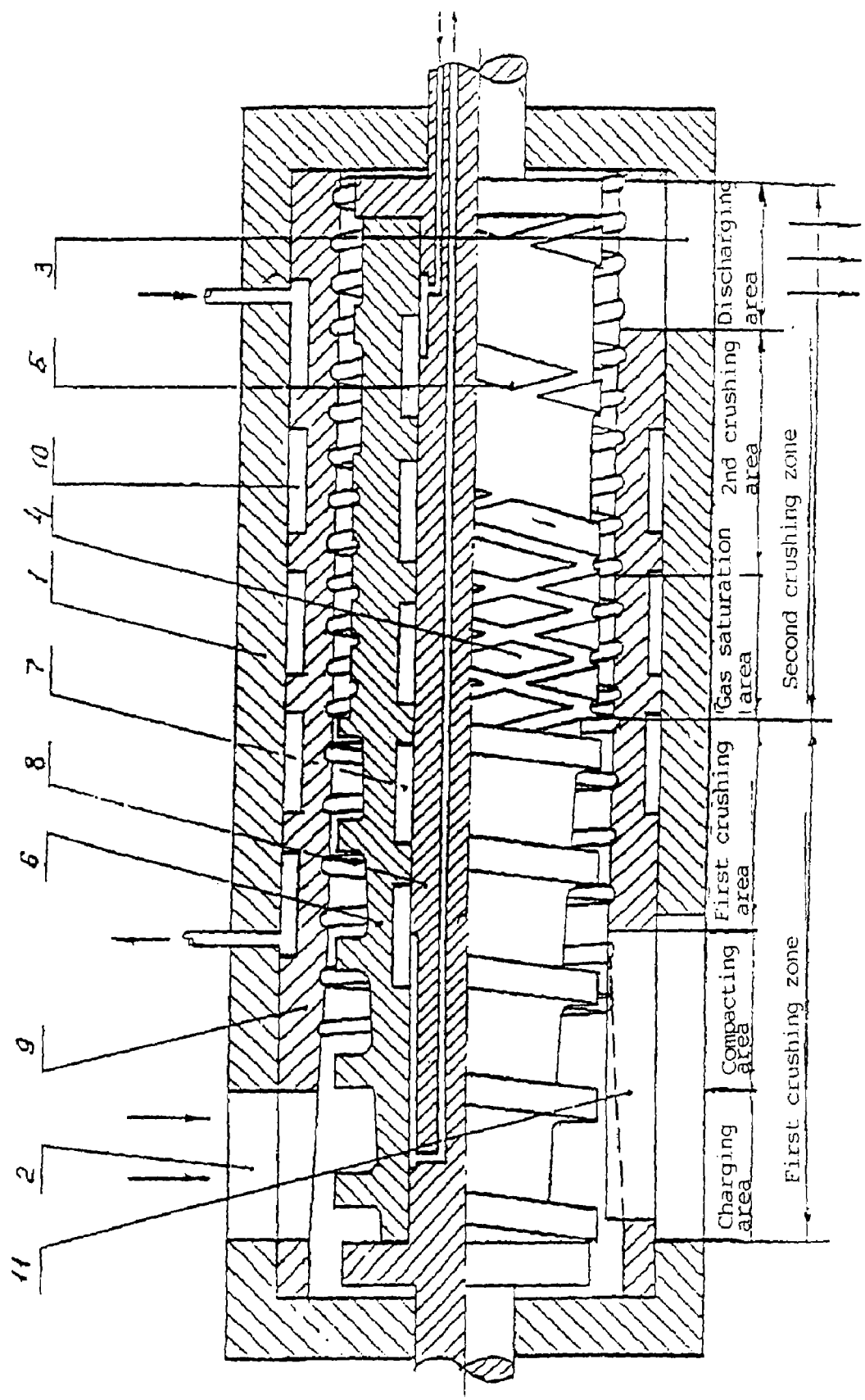
FIG. 3 is a longitudinal section through the apparatus according to the invention.

The main principle of the process is implemented in the apparatus shown in FIG. 3.

The rubber fragments previously crushed to a size of 15 mm are uniformly supplied to the charging connection 2 by a dosing mechanism not shown in FIG. 3. In the apparatus the rubber fragments are taken up by the combs of the compacting worm 6 and guided over the turns thereof with a decreasing depth start to compact. There is an increase in the volume stresses and temperature of the material. When the material reaches the first crushing area the volume stress rise rate reaches a maximum, the pulsation amplitude increases and as a result the rubber rapidly heats through. On reaching the first crushing area the rubber is destroyed under the action of the pulsating volume stress at a specific temperature (characteristic of the particular rubber). Simultaneously the gas saturation of the particles with the degradation products of the rubber and the formation of the porous structure therein commences.

On passing to activator 4 of the gas saturation area there is a thorough heating of the rubber under the action of the volume stress pulsation up to the maximum temperature. The rubber degradation products evaporate to an extreme level and the rubber particle gas saturation reaches a maximum. At the discharging worm of the second crushing area there is a pronounced decrease in the volume stresses acting on the rubber and the gas pressure tears the pores of the fine rubber particles, the specific, geometrical surface of the particles being enlarged many times. Simultaneously there is a reduction in the temperature of the rubber particles and this is continued on contact with the walls of sleeves 6 and 9.

Crushing temperature control is maintained in an optimum manner as a result of the constant pumping of the refrigerant through the coolants of the compacting worm, working member and casing. The presence of these zones in the inventive apparatus contributes to a considerable increase in its efficiency (1.5 to 2.7 times).

FIG. 3 does not show the apparatus drive. The operating parameters of the processing of tyre rubber with textile cord are given in table 1.

In an example of the implementation of the process in the apparatus the operating parameters thereof are given with a compacting worm diameter of 230 mm. The ratio of the compacting worm length along the rotation axis to the length of the activator and the discharging worm is 0.91 and the ratio of the activator length to the discharging worm length is 0.33.

The compacting worm has two starts and the casing inner surface starting cut following on to the compacting worm is formed by multistart, helical notches, the ratio of the number of notches in the straight and reverse directions being 0.5.

The activator is formed by the starting cut on the outer surface of multistart, helical notches in the straight and reverse direction in equal numbers and with a pitch which is 1.2 times greater than the starting cut pitch of the compacting worm combs.

The discharging worm is formed by the starting cut on the outer surface of multistart, helical combs in the straight direction with a pitch which is 1.2 times greater than the starting cut pitch of the compacting worm combs with a number of combs being equal to 0.5 times the number of notches of the activator in the straight direction.

The helical combs are cut through by the same number of notches with the same pitch, but in the reverse direction.

On the casing inner surface surrounding the activator and the discharging worm are formed multistart, helical notches in the straight and reverse direction with a ratio of 0.5 and a pitch 1.2 times smaller than the starting cut pitch of the activator notches.

TABLE 1

Operating parameters of processing tire rubber with textile cord

| Test No. | Shaft speed min$^{-1}$ | Output kg/h | Apparatus transit times | Vol. stress in first crushing zone MPa | Temperature in first crushing zone, °C. | Rubber powder temperature at outlet °C. |
|---|---|---|---|---|---|---|
| 1 | 32 | 80 | 6.0 + 0.8 | 42 | 155 | 35 |
| 2 | 47 | 145 | 3.4 + 1.0 | 68 | 167 | 40 |
| 3 | 56 | 166 | 2.1 + 1.3 | 90 | 170 | 42 |
| 4 | 67 | 130 | 1.3 + 0.9 | 70 | 176 | 48 |
| 5 | 76 | 105 | 1.7 + 0.4 | 60 | 153 | 57 |
| 6 | 96 | 91 | 1.5 + 0.3 | 30 | 150 | 34 |
| 7 | 60 | 154 | 3.3 + 2.7 | 150 | 185 | 71 |
| 8* | 56 | 192 | 2.2 + 1.3 | 92 | 171 | 44 |

| Test No. | Volume stress pulsation amplitude ± MPa | Volume stress pulsation frequency Hz | Volume stress increase rate MPa/s | Volume stress decrease rate MPa/s | Specific energy consumption for powder production kWh/t | Specific geometrical surface m$^2$/g |
|---|---|---|---|---|---|---|
| 1 | 3-7 | 16-305 | 5-7 | 50-55 | 800 | 0.51 |
| 2 | 5-9 | 23-450 | 20-25 | 60-70 | 540 | 0.78 |
| 3 | 8-14 | 28-535 | 42-46 | 70-75 | 430 | 0.82 |
| 4 | 12-16 | 34-645 | 52-55 | 80-95 | 515 | 0.68 |
| 5 | 15-18 | 38-731 | 85-90 | 140-150 | 760 | 0.59 |
| 6 | 15-20 | 48-922 | 60-70 | 120-130 | 800 | 0.56 |
| 7 | 8-14 | 30-576 | 45-50 | 56-61 | 486 | 0.9 |
| 8* | 8-14 | 28-535 | 42-46 | 70-75 | 415 | 1.05 |

*N.B. During rubber powder production crushing took place in the presence of the heterogeneity modifier.

As is apparent from the characteristic values given in table 1, the proposed apparatus makes it possible to implement the process for the production of highly active power over the entire range of the inventive operating parameters with the technical characteristics, which are much higher than those described in the prototype (closest prior art).

As is apparent from table 1, when crushing tyre rubber with textile cord, the apparatus makes it possible to produce powder under optimum operating parameters by modifying the shaft speed and the material supply rate (output).

Thus, the powder to be produced at shaft speed of 56 min$^{-1}$ (test no. 3) and output of 166 kg/h, had a specific geometrical surface of 0.82 m$^2$/g and a specific energy consumption of 430 kWh/t.

Moreover, the output was 192 kg/h when processing tyre rubber with textile cord in the presence of a heterogeneity modifier in a quantity of 0.2% (test no. 8) for the same shaft speed of 56 min$^{-1}$, whilst the specific, geometrical surface increased to 1.05 m$^2$/g and the energy consumption decreased to 415 kWh/t.

The tests performed confirmed a very extensive industrial usability.

The implementation of the composed, complex technical solution for the production of active rubber powders from scrap tyres and rubber article waste on the basis of different rubber types can be illustrated by the following examples.

EXAMPLE 1

The up to 15 mm pieces of scrap bus types with textile cord underwent crushing in the described apparatus with and without a heterogeneity modifier and with the following operating parameters:
- volume stress rise: 10 to 90 MPa, amplitude: 8 to 14 MPa rate of rise: 42 to 46 MPa/s,
- rubber particle deformation: 150 to 180% of the elastic component limit,
- crushing temperature: 170° C., temperature rise rate: 80 to 95° C./s,
- volume stress decrease with speed of 70 to 75 MPa/s.

The crushing led to rubber powders with the following fraction composition (without modifier):
- 69% of the particles with a size of 0.1 to 0.8 mm and 24% of the particles with a size of 0.81 to 1.6 mm,
- 7% synthetic cord fibres, and (with modifier)
- 78% of the particles with a size 0.1 to 0.8 mm and 15% of the particles with a size of 0.81 to 1.3 mm,
- 7% synthetic cord fibres.

The rubber powder also underwent a vibration-air separation with respect to synthetic cord fragments and was simultaneously fractionated in accordance with the desired particle size.

The fraction of the active rubber powder with a particle size of up to 0.8 mm was used for producing recycling rubber by prior mixing of the powder with the raw rubber mixture, which was intended for the manufacture of bus tyre rubber tread.

Table 1.1 gives technical data of the process for the production of active rubber powder and the characteristic values of its activity (specific surface). The starting material was bus tyres.

TABLE 1.1

| Test no. | Specific power consumption for powder production kWh/t | | Specific geometrical surface of powder m$^2$/g | |
|---|---|---|---|---|
| | without modifier | with modifier | without modifier | with modifier |
| 1 | 420 | 405 | 0.65 | 0.78 |
| 2 | 430 | 415 | 0.82 | 1.05 |

Table 1.2 reveals the plastoelastic and physicomechanical characteristics of bus tyre tread rubber, having, the active rubber powder produced by various processes.

TABLE 1.2

List of plastoelastic and physicomechanical characteristics of bus tire tread rubber having the active rubber powder (ARP) produced during the disposal of tires (size up to 0.8 mm).

| | Number of ARP parts by weight/100 parts by weight of rubber phase ARP type | | | | | | | | | | |
|---|---|---|---|---|---|---|---|---|---|---|---|
| | ARP unmodified | | | | | | ARP modified | | | | |
| Characteristics | 0 | 5 | 10 | 15 | 20 | 40 | 5 | 10 | 15 | 20 | 40 |
| Plasticity, agreed unit | 0.40 | 0.41 | 0.42 | 0.40 | 0.46 | 0.40 | 0.43 | 0.45 | 0.41 | 0.49 | 0.44 |
| Mooney viscosity 100° C. × 4 min | 60 | 61 | 61 | 60 | 61 | 65 | 55 | 58 | 52 | 53 | 50 |
| Vulcanization rate*, 150° C. × 30 min, T = 90 min | 10 | 10 | 9.5 | 9.7 | 9.7 | 9.7 | 8.0 | 9.0 | 9.0 | 10.0 | 9.0 |
| Modulus of elasticity 300%, MPa | 8.8 | 8.8 | 8.8 | 8.5 | 7.8 | 7.5 | 10.4 | 10.1 | 9.9 | 7.6 | 9.0 |
| Tensile strength, MPa | 18.9 | 19.5 | 17.8 | 17.6 | 15.2 | 12.5 | 19.3 | 19.7 | 19.5 | 16.6 | 16.1 |
| Relative elongation at break, % | 510 | 526 | 510 | 510 | 510 | 504 | 482 | 517 | 470 | 517 | 470 |
| Relative residual elongation after break, % | 16 | 16 | 17 | 17 | 19 | 14 | 16 | 17 | 12 | 12 | 12 |
| Breaking strength, MPa | 8.6 | 11.3 | 9.1 | 8.9 | 8.7 | 8.2 | 9.6 | 9.1 | 9.1 | 9.0 | 8.4 |
| Shore A hardness | 61 | 64 | 67 | 65 | 63 | 65 | 66 | 66 | 65 | 60 | 64 |
| Volume losses on abrading | 32 | 34 | 24 | 29 | 35 | 55 | 32 | 34 | 32 | 32 | 35 |

| | Number of ARP parts by weight/100 parts by weight of rubber phase ARP type ARP modified + 3% cord | | | | |
|---|---|---|---|---|---|
| Characteristics | 5 | 10 | 15 | 20 | 40 |
| Plasticity, agreed unit | 0.48 | 0.46 | 0.46 | 0.42 | 0.48 |
| Mooney viscosity 100° C. × 4 min | 55 | 54 | 56 | 57 | 61 |
| Vulcanization rate*, 150° C. × 30 min, T = 90 min | 8.0 | 7.0 | 8.0 | 8.0 | 8.0 |
| Modulus of elasticity 300%, MPa | 10.9 | 10.9 | 10.2 | 9.9 | 9.8 |

TABLE 1.2-continued

List of plastoelastic and physicomechanical characteristics of bus tire tread rubber having the active rubber powder (ARP) produced during the disposal of tires (size up to 0.8 mm).

| | | | | | |
|---|---|---|---|---|---|
| Tensile strength, MPa | 19.8 | 18.8 | 18.9 | 18.3 | 17.3 |
| Relative elongation at break, % | 500 | 492 | 495 | 510 | 492 |
| Relative residual elongation after break, % | 16 | 12 | 12 | 12 | 12 |
| Breaking strength, MPa | 9.0 | 9.0 | 8.4 | 8.1 | 9.7 |
| Shore A hardness | 66 | 67 | 66 | 66 | 66 |
| Volume losses on abrading | 32 | 34 | 34 | 32 | 34 |

*Monsanto rheometer

Notes:
1. Modified ARP can be very well homogenized during the production of rubber mixtures.
2. Vulcanized, modified ARP-containing rubbers have a planar, smooth surface.

As is apparent from the tables, the process according to the invention makes it possible to produce a high grade, active rubber powder, whose introduction into the tread rubber in values of up to 10 parts by weight leads to no deterioration in the characteristics thereof. When using the heterogeneity modifier during crushing, the quantity of powder to be introduced can be increased by at least up to 15 parts by weight. The use of modifiers also makes it possible to reduce energy consumption during crushing and increase the plant output (by 15 to 55%, as shown by the tests).

EXAMPLE 2

Waste from rubber articles based on ethylene-propylene rubber with a particle size of up to 15 mm were crushed in the described apparatus with and without a heterogeneity modifier and with the following operating parameters:
 volume stress rise: 10 to 140 MPa, amplitude: 6 to 12 MPa, rate of rise: 40 to 50 MPa/s,
 deformation of rubber particles: 130 to 170% of the elastic component limit,
 crushing temperature: 210 to 240° C., temperature rise rate: 70 to 90° C./s,
 volume stress decrease at rate of 30 to 40 MPa/s.

The rubber powder produced with the modifier consists of 84% particles of size 0.1 to 0.8 mm and 16% of particles of size 0.81 to 1.25 mm and the rubber powder produced without a modifier consists of 79% particles of size 0.1 to 0.8 mm and 11% particles of size 0.81 to 1.45 mm.

The fraction of the active rubber powder with the particle size of up to 0.8 mm was used for producing recycling rubber by premixing the powder with the raw rubber mixture based on ethylene-propylene rubber intended for the production of rubber articles.

Table 2.1 gives the technical data of the process for the production of the active rubber powder and its specific, geometrical surface.

TABLE 2.1

| | Specific power consumption for powder production kWh/t | | Specific, geometrical powder surface m²/g | |
|---|---|---|---|---|
| Starting material | without modifier | with modifier | without modifier | with modifier |
| Rubber article waste | 400 | 370 | 0.75 | 1.05 |

Table 2.2 gives the physicomechanical characteristics of rubber based on ethylene-propylene rubber containing the rubber powder produced with and without modifier.

TABLE 2.2

Number of ARP parts by weight/100 parts by weight of rubber phase
ARP type

| | ARP unmodified | | | | | ARP modified | | | |
|---|---|---|---|---|---|---|---|---|---|
| Characteristics | 0 | 5 | 10 | 20 | 40 | 5 | 10 | 20 | 40 |
| Plasticity | 0.52 | 0.52 | 0.50 | 0.50 | 0.52 | 0.54 | 0.56 | 0.56 | 0.54 |
| Tensile strength MPa | 160 | 165 | 168 | 170 | 155 | 170 | 172 | 176 | 170 |
| Relative elongation % | 280 | 286 | 284 | 284 | 280 | 296 | 296 | 290 | 284 |
| Impact elasticity % | 36 | 38 | 38 | 40 | 38 | 38 | 40 | 42 | 42 |

The results make it clear that the process according to the invention leads to the obtaining of rubber mixtures based on ethylene-propylene rubbers containing up to 40 parts by weight of the powder with no significant deterioration in the technical and technological characteristics.

EXAMPLE 3

Rubber article waste based on fluorinated rubber-vinylidene fluoride-trichlorofluoroethylene copolymer—of particle size up to 15 mm underwent crushing in the described apparatus in the presence of a modifier and with the following operating parameters:

volume stress rise: 10 to 190 MPa, amplitude: 10 to 16 MPa, rate of rise: 40 to 70 MPa/s,
deformation of rubber particles: 150 to 190% of elastic component limit,
crushing temperature: 240 to 270° C., temperature rise rate: 90 to 125° C./s,
volume stress decrease with rate of 60 to 80 MPa/s.

The fraction of the active rubber powder with particle size up to 0.8 mm was used for introduction in a quantity of 5 to 15 parts by weight into the rubber mixture having the following composition:

SKF 32*: 100 parts by weight,
copper-salicylalimine: 5 parts by weight,
zinc white: 5 parts by weight,
technical carbon η-701: 30 parts by weight,
calcium stearate: 5 parts by weight.

Technical characteristics of the test rubber are given in table 3.1.

As is apparent from the results submitted, the introduction of the active rubber powder produced from fluorinated rubber-based product into the primary starting rubber in a quantity of up to 15 parts by weight does not modify the technical characteristics thereof.

EXAMPLES 4 TO 10

The processes were performed similar to examples 1 and 2. However, in addition, 20 to 40% of the waste of high and low pressure polyethylene and polypropylene were introduced. A mixed material was obtained with a volume stress rise of 15 to 200 MPa, amplitude of 12 to 16 MPa, rate of rise 50 to 60 MPa/s, temperature of 180 to 230° C., temperature rise rate of 100 to 110° C./s and volume stress values giving rise to a deformation of the rubber particles of 115 to 175% of the limit of the elastic deformation component of the starting rubber and a volume stress decrease with a rate of 70 to 90 MPa/s. The modifier must be present. The mixed powders obtained consisted of 82 to 94% of particles with a size up to 0.8 mm. These powders were also treated using an extrusion or calendering process at temperatures of 290 to 240° C. in order to obtain plate-like, thermoplastic materials, whose properties are given in table 4.1.

TABLE 3.1

| Sample | Tensile strength, MPa | Relative elongation, % | Residual elongation, % | Shore A hardness | Relative elongation change at 200%, 72 h, % | Relative compression set 20%, 150° C., 24 h | Weight change SZR-1, 23° C., 24 h % |
|---|---|---|---|---|---|---|---|
| Starting sample | 25.5 | 105 | 2 | 80 | −50.9 | 62.8 | 2.5 |
| Starting sample + 5 parts by weight of powder | 20.5 | 95 | 4 | 82 | −49.4 | 65.0 | 1.5 |
| Starting sample + 10 parts by weight of powder | 23.5 | 120 | 5 | 81 | −48.3 | 66.7 | 1.6 |
| Starting sample + 15 parts by weight of powder | 22.0 | 115 | 6 | 78 | −41.5 | 61.1 | 1.5 |
| Standard value | no less than 20 | no less than 90 | no more than 10 | 76-86 | −65 + 25 | no more than 70 | 0-3.5 |

*SKF-32: vinylidene fluoride-trichloroflouroethylene copolymer.

TABLE 4.1

| | | Physicomechanical characteristics | | | |
|---|---|---|---|---|---|
| Example No. | Material | Tensile strength, MPa | Relative elongation, % | Shore A hardness | Breaking strength, MPa |
| 1 | Scrap tire rubber + 40% high pressure polyethylene waste | 26.5 | 450 | 68 | 12.6 |
| 2 | Scrap tire rubber + 20% low pressure polyethylene waste | 24.8 | 400 | 70 | 11.8 |

TABLE 4.1-continued

| | | Physicomechanical characteristics | | | |
|---|---|---|---|---|---|
| Example No. | Material | Tensile strength, MPa | Relative elongation, % | Shore A hardness | Breaking strength, MPa |
| 3 | Scrap tire rubber + 20% polypropylene waste | 25.4 | 220 | 84 | 13.6 |
| 4 | Scrap tire rubber + 40% polypropylene waste | 29.2 | 180 | 88 | 14.8 |
| 5 | Rubber waste based on ethylene-propylene rubber + 40% high pressure polyethylene waste | 26.2 | 380 | 72 | 8.9 |
| 6 | Rubber waste based on ethylene-propylene rubber + 40% low pressure polyethylene waste | 26.8 | 260 | 84 | 9.2 |
| 7 | Rubber waste based on ethylene-propylene rubber + 20% polypropylene waste | 28.0 | 210 | 82 | 9.1 |

EXAMPLE 11

The waste from rubber articles based on ethylene-propylene rubber with a particle size of 10 to 20 mm underwent crushing in the apparatus with the following operating parameters, the working surfaces of the sleeves being treated with fluoro-organic alcohol telomers and coated with an underlayer of tungsten carbide containing cobalt and with a total thickness of 0.3±0.1 mm:
  volume stress rise: 20 to 1.20 MPa, amplitude: 8 to 12 MPa, rate of rise: 50±5 MPa/s,
  crushing temperature: 200 to 215° C., temperature rise rate: 60 to 75° C./s,
  volume stress decrease with a rate of 20 to 30 MPa/s.

| Starting material | Power consumption cf modifier, kW | Capacity kg/h | Rubber powder quantity with particle size below 0.8 mm |
|---|---|---|---|
| Rubber article waste based on ethylene-propylene rubber | without treatment of the working surfaces of the sleeves | | |
| | 67 to 70 | 160 to 165 | 64 to 66 |
| | with treatment of the working surfaces of the sleeves | | |
| | 55 to 60 | 210 to 225 | 72 to 75 |

What is claimed is:

1. A method for the manufacture of a highly active rubber powder with a geometrical surface of 0.4 to 5 $m_2/g$ from scrap tires and vulcanized waste of rubber articles based on different rubber types in an extrusion type apparatus under thermomechanical action comprising reducing the size of scrap tires and vulcanized waste of rubber articles to rubber particles by subjecting the scrap tires and vulcanized waste of rubber articles to a pulsating volume strain of 15 to 250 MPa increasing at a rate of 5 to 90 MPa/s, with an amplitude +/−5 to 20 MPa and a frequency of 5 to 600 Hz, as well as with a temperature in the range of 90 to 380° C. increasing at a rate of 50 to 150° C./s accompanied by the simultaneous gas saturation of rubber with degradation products of plasticizing agents with a combining of such components initially taking place accompanied by the formation of a porous structure in the volume of the particles, and in the case of a marked volume strain reduction at a rate of 50 to 150 MPa/s, the porous structure is then destroyed, wherein geometrical surfaces of the rubber particles are increased and the particles are cooled.

2. The method according to claim 1, wherein the vulcanized waste of rubber articles and scrap tires comprises one or more of isoprene, butadiene, styrene butadiene, nitrile butadiene rubbers, including hydrogenated carboxylate, ethylene-propylene, fluorine, fluorosilicone, butadiene vinyl pyridine, silicone, epichiorohydrin, polychloroprene, chlorosulphonated, polyisobutylene and acrylate rubbers.

3. The method according to claim 2 which comprises a deformation of vulcanized rubber pieces in the range of 105% to 250% of a limit of an elastic component of rubber deformation, accompanied by a simultaneous temperature reduction at a rate of 70° C./s to 150° C./s.

4. The method according to claim 3 wherein the increase of the geometrical surfaces of the rubber powder particles by 15% to 40% homogeneity modifiers are introduced, which homogeneity modifiers comprise alcohol telomers of the formula $H(CH_2—CF_2)_n—CH_2OH$, where n>4, N-nitrosodiphenylamine, N-cyclohexylthiophthalimide in a quantity of 0.1 to 1.9%.

5. The method according to claim 3 wherein for the manufacture of a highly active rubber from rubber waste, whose composition lacks constituents degradable at high temperatures, one or more of alcohol telomers, sulphenamide M, sulphenamide Z, stearic, oleic, citric and oxalic acid—are introduced in a quantity of 0.2% to 5.0%, and are combined with rubbers to form volatile substances at a temperature of 70° C. to 120° C.

6. The method according to claim 3 which includes a size reduction of waste of rubber articles and waste of thermoplastics and/or thermoelastoplastics, said waste comprising one or more of polyethylenes, polypropylenes, polyvinyl chlorides, polyethylene terephthalates, styrene-butadiene block copolymers.

7. The method according to claim 2 wherein the increase of the geometrical surfaces of the rubber powder particles by 15% to 40%, homogeneity modifiers are introduced, which homogeneity modifiers comprise alcohol telomers of the formula $H(CH_2—CF_2)_n—CH_2OH$, where n>4, N-nitrosodiphenylamine, N-cyclohexylthiophthalimide in a quantity of 0.1 to 1.9%.

8. The method according to claim 7 which includes a size reduction of waste of rubber articles and waste of thermoplastics and/or thermoelastoplastics, said waste comprising one or more of polyethylenes, polypropylenes, polyvinyl chlorides, polyethylene terephthalates, styrene-butadiene block copolymers.

9. The method according to claim 2 wherein for the manufacture of a highly active rubber from rubber waste, whose composition lacks constituents degradable at high temperatures, one or more of alcohol telomers, sulphenamide M, sulphenamide Z, stearic, oleic, citric and oxalic acid—are introduced in a quantity of 0.2% to 5.0%, and are combined with rubbers to form volatile substances at a temperature of 70° C. to 120° C.

10. The method according to claim 2 which includes a size reduction of waste of rubber articles and waste of thermoplastics and/or thermoelastoplastics, said waste comprising one or more of polyethylenes, polypropylenes, polyvinyl chlorides, polyethylene terephthalates, and styrene-butadiene block copolymers.

11. The method according to claim 1 which comprises a deformation of vulcanized rubber pieces in the range of 105% to 250% of a limit of an elastic component of rubber deformation, accompanied by a simultaneous temperature reduction at a rate of 70° C./s to 150° C./s.

12. The method according to claim 11 wherein the increase of the geometrical surfaces of the rubber powder particles by 15% to 40% homogeneity modifiers are introduced, which homogeneity modifiers comprise alcohol telomers of the formula $H(CH_2—CF_2)_n—CH_2OH$, where n>4, N-nitrosodiphenylamine, N-cyclohexylthiophthalimide in a quantity of 0.1 to 1.9%.

13. The method according to claim 11 wherein for the manufacture of a highly active rubber from rubber waste, whose composition lacks constituents degradable at high temperatures, one or more of alcohol telomers, sulphenamide M, sulphenamide Z, stearic, oleic, citric and oxalic acid—are introduced in a quantity of 0.2% to 5.0%, and are combined with rubbers to form volatile substances at a temperature of 70° C. to 120° C.

14. The method according to claim 11 which includes a size reduction of waste of rubber articles and waste of thermoplastics and/or thermoelastoplastics, said waste comprising one or more of polyethylenes, polypropylenes, polyvinyl chlorides, polyethylene terephthalates, styrene-butadiene block copolymers.

15. The method according to claim 1 wherein the increase of the geometrical surfaces of the rubber powder particles by 15% to 40%, homogeneity modifiers are introduced, which homogeneity modifiers comprise alcohol telomers of the formula $H(CH_2—CF_2)_n—CH_2OH$, where n>4, N-nitrosodiphenylamine, N-cyclohexylthiophthalimide in a quantity of 0.1 to 1.9%.

16. The method according to claim 15 which includes a size reduction of waste of rubber articles and waste of thermoplastics and/or thermoelastoplastics, said waste comprising one or more of polyethylenes, polypropylene, polyvinyl chlorides, polyethylene terephthalates, styrene-butadiene block copolymers.

17. The method according to claim 1 wherein for the manufacture of a highly active rubber, from rubber waste, whose composition lacks constituents degradable at high temperatures, one or more of alcohol telomers, sulphenamide M, sulphenamide Z, stearic, oleic, citric and oxalic acids, are introduced in a quantity of 0.2% to 5.0%, and are combined with rubbers to form volatile substances at a temperature of 70° C. to 120° C.

18. The method according to claim 1 which includes a size reduction of waste of rubber articles and waste of thermoplastics and/or thermoelastoplastics, said waste comprising one or more of polyethylenes, polypropylenes, polyvinyl chlorides, polyethylene terephthalates, and styrene-butadiene block copolymers.

19. The method according to claim 1 wherein for the manufacture of a highly active rubber from rubber waste, whose composition lacks constituents degradable at high temperatures, one or more of alcohol telomers, sulphenamide M, sulphenamide Z, stearic, oleic, citric and oxalic acid—are introduced in a quantity of 0.2% to 5.0%, and are combined with rubbers to form volatile substances at a temperature of 70° C. to 120° C.

* * * * *